United States Patent
Constantinou

(10) Patent No.: US 12,030,225 B2
(45) Date of Patent: *Jul. 9, 2024

(54) TRANSPARENT TOOLING FOR UV RADIATION CURABLE RUBBER

(71) Applicant: NIKE, Inc., Beaverton, OR (US)

(72) Inventor: Jay Constantinou, Beaverton, OR (US)

(73) Assignee: NIKE, INC., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/318,010

(22) Filed: May 16, 2023

(65) Prior Publication Data

US 2023/0286194 A1 Sep. 14, 2023

Related U.S. Application Data

(60) Continuation of application No. 17/195,122, filed on Mar. 8, 2021, now Pat. No. 11,673,294, which is a
(Continued)

(51) Int. Cl.
*B29C 35/08* (2006.01)
*B29C 33/22* (2006.01)
(Continued)

(52) U.S. Cl.
CPC .............. *B29C 33/40* (2013.01); *B29C 33/22* (2013.01); *B29C 35/0805* (2013.01);
(Continued)

(58) Field of Classification Search
CPC ............ B29C 2033/0005; B29C 33/40; B29C 2035/0827; B29C 35/08; B29C 33/00;
(Continued)

(56) References Cited

U.S. PATENT DOCUMENTS

| 2,684,305 A | 7/1954 | Leroy |
| 3,250,840 A | 5/1966 | Procopio |

(Continued)

FOREIGN PATENT DOCUMENTS

| CA | 2332315 | 10/2000 |
| CN | 1085756 A | 4/1994 |

(Continued)

OTHER PUBLICATIONS

Written Opinion of the International Preliminary Examining Authority for PCT/US2018/028815 dated Apr. 23, 2019.
(Continued)

*Primary Examiner* — Atul P. Khare
(74) *Attorney, Agent, or Firm* — THOMAS | HORSTEMEYER, LLP

(57) ABSTRACT

A mold, a molding apparatus, and a method for manufacturing articles or components is used to manufacture an article or component of the article that at least partially comprises an ultraviolet (UV) curable material. The mold and apparatus comprise at least one mold wall formed of a cyclic olefin copolymer, which is in contact with UV radiation curable material and allows the article or component of the article to be exposed to UV radiation for a period of time in order to provide for at least partial cure thereof.

19 Claims, 7 Drawing Sheets

Related U.S. Application Data division of application No. 15/959,557, filed on Apr. 23, 2018, now abandoned.

(60) Provisional application No. 62/547,986, filed on Aug. 21, 2017, provisional application No. 62/488,971, filed on Apr. 24, 2017, provisional application No. 62/488,978, filed on Apr. 24, 2017.

(51) Int. Cl.
| | |
|---|---|
| *B29C 33/40* | (2006.01) |
| *B29C 37/00* | (2006.01) |
| *B29C 45/16* | (2006.01) |
| *B29D 35/12* | (2010.01) |
| *B29C 33/00* | (2006.01) |
| *B29K 75/00* | (2006.01) |
| *B29K 105/08* | (2006.01) |
| *B29L 31/48* | (2006.01) |
| *B29L 31/50* | (2006.01) |

(52) U.S. Cl.
CPC ...... *B29C 35/0888* (2013.01); *B29C 37/0025* (2013.01); *B29C 45/1679* (2013.01); *B29D 35/128* (2013.01); *B29C 2033/0005* (2013.01); *B29C 2035/0827* (2013.01); *B29K 2075/00* (2013.01); *B29K 2105/0809* (2013.01); *B29K 2823/06* (2013.01); *B29K 2823/08* (2013.01); *B29K 2823/38* (2013.01); *B29K 2995/0012* (2013.01); *B29K 2995/0027* (2013.01); *B29L 2031/48* (2013.01); *B29L 2031/50* (2013.01)

(58) Field of Classification Search
CPC ..... B29C 33/0011; B29C 33/20; B29C 33/38; B29C 35/0805; B29C 45/1679; B29C 45/14336; B29C 37/0025
See application file for complete search history.

(56) References Cited

U.S. PATENT DOCUMENTS

| | | | |
|---|---|---|---|
| 5,275,372 | A | 1/1994 | Boeckeler |
| 5,298,303 | A | 3/1994 | Kerr et al. |
| 5,389,176 | A | 2/1995 | Nakanishi et al. |
| 5,632,057 | A | 5/1997 | Lyden |
| 5,763,049 | A | 6/1998 | Frey et al. |
| 5,885,514 | A | 3/1999 | Tensor |
| 6,551,531 | B1 | 4/2003 | Ford et al. |
| 7,695,668 | B2 | 4/2010 | Takahashi et al. |
| 7,732,513 | B2 | 6/2010 | Jimbo |
| 7,981,342 | B2 | 7/2011 | Hayes et al. |
| 8,109,757 | B1 | 2/2012 | Fusi, III |
| 8,333,360 | B2 | 12/2012 | Rule et al. |
| 8,344,070 | B2 | 1/2013 | Squire et al. |
| 8,398,903 | B2 | 3/2013 | Hagmann et al. |
| 10,182,615 | B2 | 1/2019 | Jacobsen |
| 10,645,992 | B2 | 5/2020 | Le et al. |
| 2002/0018281 | A1 | 2/2002 | Theiste et al. |
| 2004/0004300 | A1 | 1/2004 | Yamaguchi et al. |
| 2004/0087754 | A1 | 5/2004 | Foley et al. |
| 2004/0143034 | A1 | 7/2004 | Primke et al. |
| 2005/0056954 | A1 | 3/2005 | Devlin et al. |
| 2006/0194707 | A1 | 8/2006 | Lu |
| 2007/0204482 | A1 | 9/2007 | Gibson-Collinson |
| 2008/0033112 | A1 | 2/2008 | Squire et al. |
| 2009/0302507 | A1 | 12/2009 | Tsunozaki et al. |
| 2012/0021151 | A1 | 1/2012 | Tatarka et al. |
| 2013/0134636 | A1 | 5/2013 | Schneider et al. |
| 2014/0020192 | A1 | 1/2014 | Jones et al. |
| 2014/0310986 | A1 | 10/2014 | Tamm et al. |
| 2014/0320986 | A1 | 10/2014 | You |
| 2016/0021969 | A1 | 1/2016 | Lettow, II et al. |
| 2016/0103255 | A1 | 4/2016 | Powell et al. |
| 2016/0227876 | A1 | 8/2016 | Le et al. |
| 2016/0262489 | A1 | 9/2016 | Holmes et al. |
| 2016/0295971 | A1 | 10/2016 | Arnese et al. |
| 2016/0362552 | A1 | 12/2016 | Reichel et al. |
| 2019/0329457 | A1 | 10/2019 | Miyake et al. |

FOREIGN PATENT DOCUMENTS

| | | | | |
|---|---|---|---|---|
| CN | 1240167 | A | 1/2000 | |
| CN | 102529287 | A | 7/2012 | |
| CN | 103561929 | A | 2/2014 | |
| CN | 104859277 | A | 8/2015 | |
| CN | 104924611 | A | 9/2015 | |
| CN | 106037143 | A | 10/2016 | |
| CN | 106418874 | A | 2/2017 | |
| DE | 19753863 | A1 | 6/1986 | |
| EP | 137888 | A2 | 7/1986 | |
| EP | 1378898 | A1 | 1/2004 | |
| EP | 1434211 | A1 | 6/2004 | |
| EP | 1484148 | A1 | 12/2004 | |
| EP | 1872924 | A1 | 1/2008 | |
| EP | 2441338 | A2 | 4/2012 | |
| EP | 2671703 | A2 | 12/2013 | |
| EP | 2838708 | A2 | 2/2015 | |
| EP | 3053732 | A1 | 8/2016 | |
| JP | S6224705 | U | 2/1987 | |
| JP | H0345902 | A | 2/1991 | |
| JP | 2000108137 | A | 4/2000 | |
| KR | 20140141815 | A | * 12/2014 | ............... H05K 5/03 |
| WO | 2007066652 | A1 | 6/2007 | |
| WO | 2012170008 | A1 | 12/2012 | |
| WO | 2014015033 | A2 | 1/2014 | |
| WO | 2016089462 | A1 | 6/2016 | |
| WO | 2017007533 | A1 | 1/2017 | |

OTHER PUBLICATIONS

International Preliminary Report on Patentability for PCT/US2018/028817 dated May 8, 2019.
International Search Report for PCT/US2018/028815 dated Jul. 24, 2018.
TOPAS: Cycloolefin Copolymer (COC) Brochure. TOPAS Advanced Polymers. Retrieved online Jan. 11, 2021 from https://topas.com/sites/default/files/files/topas_product-brochure_english.pdf. Published 2008. (Year: 2008).
International Preliminary Report on Patentability for PCT /US2018/028814 dated May 8, 2019.
International Preliminary Report on Patentability for PCT/US2018/028815 dated Jul. 8, 2019.
International Search Report for PCT/US2018/022814 dated Sep. 6, 2018.
International Search Report for PCT/US2018/028817 dated Jul. 24, 2018.
International Preliminary Report on Patentability for PCT /US2018/028812 dated Aug. 7, 2019.
Written Opinion of the International Preliminary Examining Authority for PCT/US2018/028812 dated Mar. 7, 2019.
International Search Report for PCT/US2018/028812 dated Jul. 10, 2018.

* cited by examiner

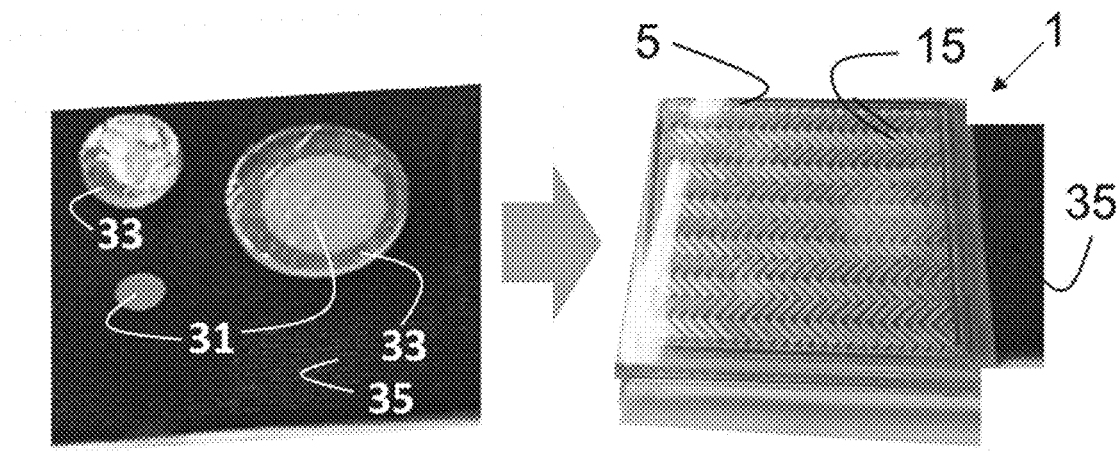
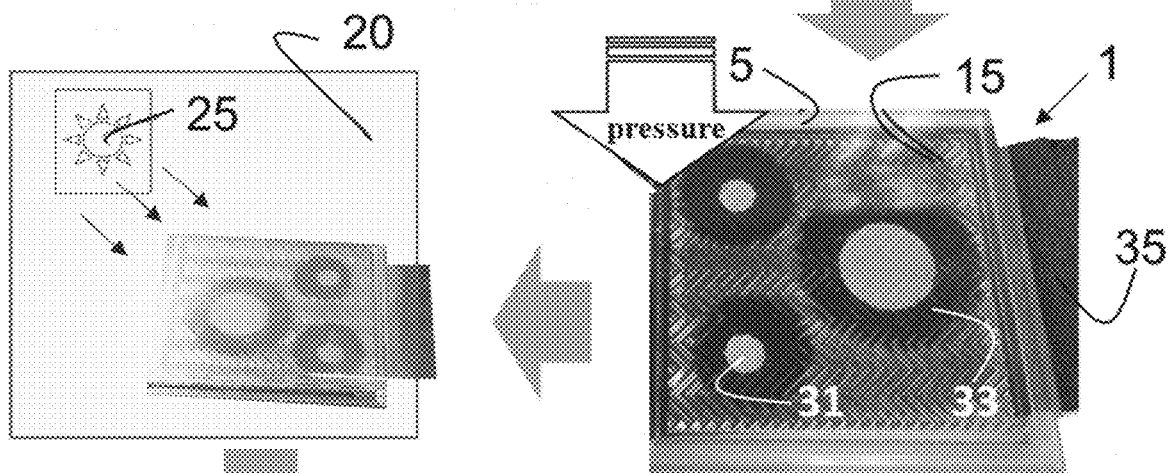
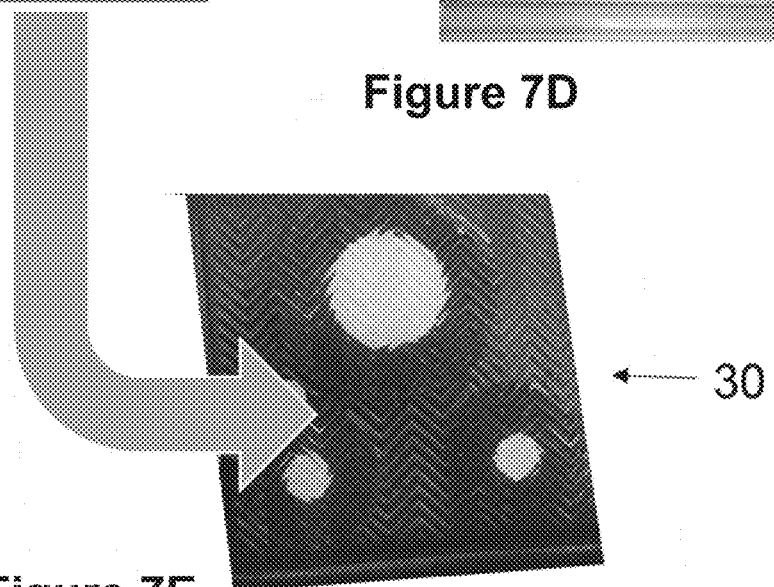
Figure 7A  Figure 7B  Figure 7C  Figure 7D  Figure 7E

TRANSPARENT TOOLING FOR UV RADIATION CURABLE RUBBER

CROSS-REFERENCE TO RELATED APPLICATIONS

This application is a continuation of U.S. Non-Provisional application Ser. No. 17/195,122, having the title "TRANSPARENT TOOLING FOR UV RADIATION CURABLE RUBBER," filed on Mar. 8, 2021, which is a divisional of U.S. Non-Provisional application Ser. No. 15/959,557, having the title "TRANSPARENT TOOLING FOR UV RADIATION CURABLE RUBBER," filed on Apr. 23, 2018, which application claims the benefit of and priority to U.S. Provisional Application No. 62/547,986, having the title "TRANSPARENT TOOLING FOR UV-CURABLE RUBBER," filed on Aug. 21, 2017, U.S. Provisional Application No. 62/488,978, having the title "APPAREL AND SPORTING EQUIPMENT WITH AN UV CURABLE MATERIAL AND METHOD OF MANUFACTURING THEREOF," filed on Apr. 24, 2017, and U.S. Provisional Application No. 62/488,971, having the title "ARTICLE WITH UV CURABLE MATERIAL ADHERED TO TEXTILE AND METHOD OF MAKING THE SAME," filed on Apr. 24, 2017, the contents of which are each incorporated by reference in their entirety.

FIELD

This disclosure relates generally to a mold, a molding apparatus, and a method for manufacturing articles or components of articles. More specifically, the disclosure relates to a mold, a molding apparatus and a method of using an ultraviolet (UV) curable material to form an article or a component of an article, including a molded footwear or sporting equipment component.

BACKGROUND

The statements in this section merely provide background information related to the present disclosure and may not constitute prior art.

Conventional molding processes generally involve heating a thermoplastic polymer resin to a temperature that allows the polymer to flow under pressure, injecting or extruding the polymer into a cavity formed within a mold or die, and allowing the polymer to cool, thereby, forming a finished product that is in the shape or form of the cavity. Materials which react to form thermoset polymers may be used in a molding process without the need to cool the material to solidify it and form a product that has the shape of the cavity. When these materials are used, the mold is maintained at a temperature and pressure that causes the polymers to cure or cross-link via a chemical reaction to form a thermoset material.

Polymeric materials that are capable of curing upon exposure to ultraviolet (UV) radiation are normally not selected for the manufacture of articles or components of articles that are relatively thick in at least one dimension and/or exhibit a complex geometry. Since UV curable resins only cure in regions that are exposed to a threshold level of UV radiation, a thick component or one having a complex geometry may suffer from one or more regions remaining uncured. Thus, UV curable resins are normally used only to form thin layers, such as those found in the application of coatings or adhesives.

The molds used in conventional molding processes are usually expensive to build and/or replace. These molds are often made of steel in order to withstand the high temperature and/or pressure requirements of the molding process. The cost of these molds may further be increased when the surface of the metal that forms the cavity of the mold needs to be polished or textured.

DRAWINGS

In order that the disclosure may be well understood, there will now be described various forms thereof, given by way of example, reference being made to the accompanying drawings, in which.

Figure 6:
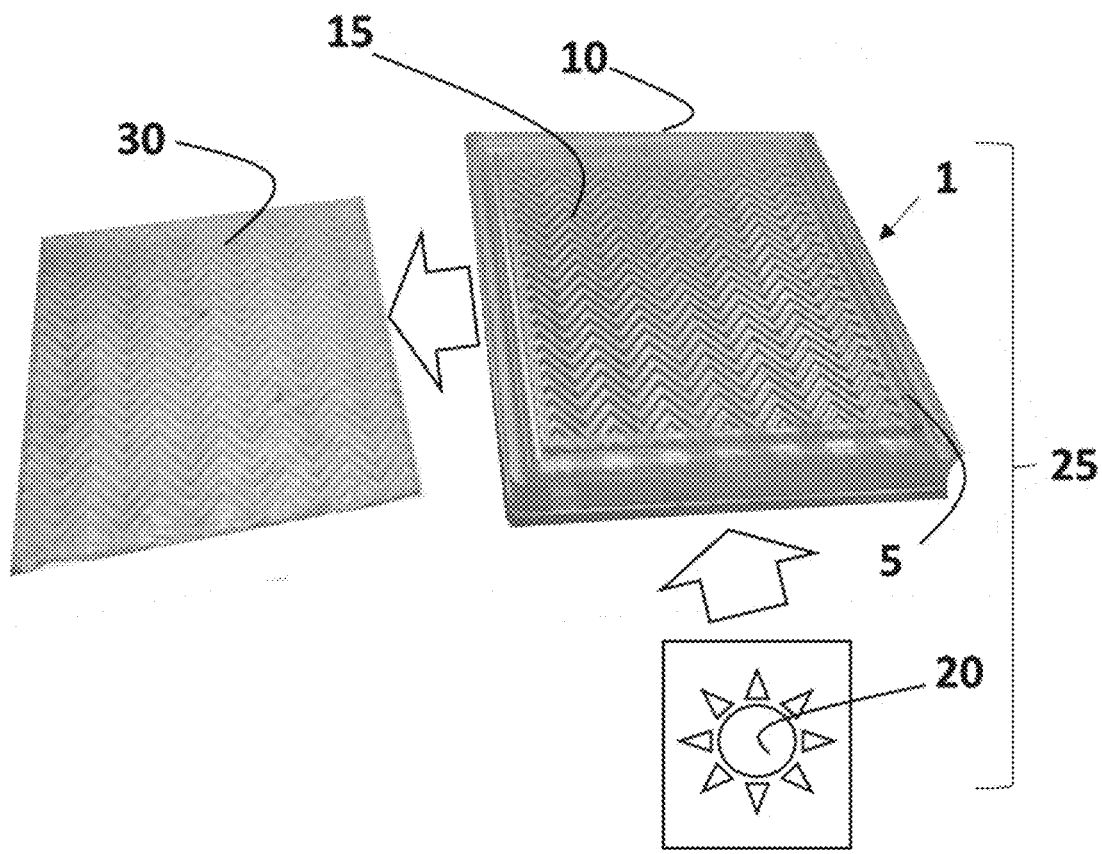

FIG. 6 is a perspective view of a mold apparatus formed according to the teachings of the present disclosure that may be used to manufacture an article from a UV radiation curable material; and FIGS. 7(A-E) is a perspective view of another mold apparatus formed according to the teachings of the present disclosure that may be used to manufacture a component of an article from a UV radiation curable material.

The drawings described herein are for illustration purposes only and are not intended to limit the scope of the present disclosure in any way.

DETAILED DESCRIPTION

The use of ultraviolet (UV) radiation curable materials in forming or at least partially forming an article or a component of an article offers multiple benefits to a manufacturing operation. More specifically, the use of such materials may increase productivity, lower costs associated with the fabrication of a mold, lower energy costs, and induce less part shrinkage due to low curing temperatures and faster cure times. However, in order to process such materials, the manufacturing operation needs to include equipment and processes that allow the UV radiation curable materials to be exposed to ultraviolet (UV) radiation for a duration of time that is necessary to at least partially cure the material. The present disclosure generally relates to a mold, a molding apparatus, and a method of using UV curable materials to form an article or a component of an article, including a molded footwear or sporting equipment component.

According to one aspect of the present disclosure, a mold for forming a molded article is provided that comprises a mold wall formed of a cyclic olefin copolymer. The mold also includes a molding surface for contact with an article-forming material in order to form the molded article.

According to another aspect of the present disclosure, a method for making a mold used to form a molded article is described. This method includes forming a mold wall comprising a cyclic olefin copolymer and having a molding surface for contact with an article-forming material for forming the molded article. When necessary or desirable the step of forming the mold wall may comprise introducing a molten cyclic olefin copolymer to a master mold and solidifying the molten cyclic olefin copolymer in the master mold to form the mold wall.

A method for forming a molded article may also comprise the following steps according to another method of the present disclosure. An article-forming material is introduced in to a mold that includes a mold wall comprising a cyclic olefin copolymer. The article-forming material makes contact with a molding surface of the mold wall in order to form the molded article.

According to yet another aspect of the present disclosure, an apparatus for forming a molded article is provided. This apparatus includes a mold having a mold wall that comprises a cyclic olefin copolymer and that is substantially transparent to UV light. The mold wall has a molding surface for contacting an article-forming material. An UV light source is disposed adjacent to the mold wall on a side opposite the molding surface and configured to generate UV light for transmission through the mold wall to the molding surface for exposing the article-forming material to the UV light.

Thus, the present disclosure generally provides a mold, a molding apparatus, and a method for manufacturing articles or components of articles. The article or component of the article at least partially comprises an UV radiation curable material. Thus, the mold, apparatus, and method of molding the article or component of the article may include exposure of the UV radiation curable material to UV radiation for a period of time that allows at least partial cure thereof. Further areas of applicability will become apparent from the description provided herein.

The following description and specific examples are merely exemplary in nature and is in no way intended to limit the present disclosure or its application or uses. For example, the molded component comprising an UV radiation curable material made and used according to the teachings contained herein is described throughout the present disclosure in conjunction with footwear in order to more fully illustrate the composition and the use thereof. The incorporation and use of such a molded UV radiation curable component in other applications, including apparel such as garments, sporting equipment, or the like, as well as components thereof, are contemplated to be within the scope of the present disclosure. It should be understood that throughout the description, corresponding reference numerals indicate like or corresponding parts and features.

Figure 1A:
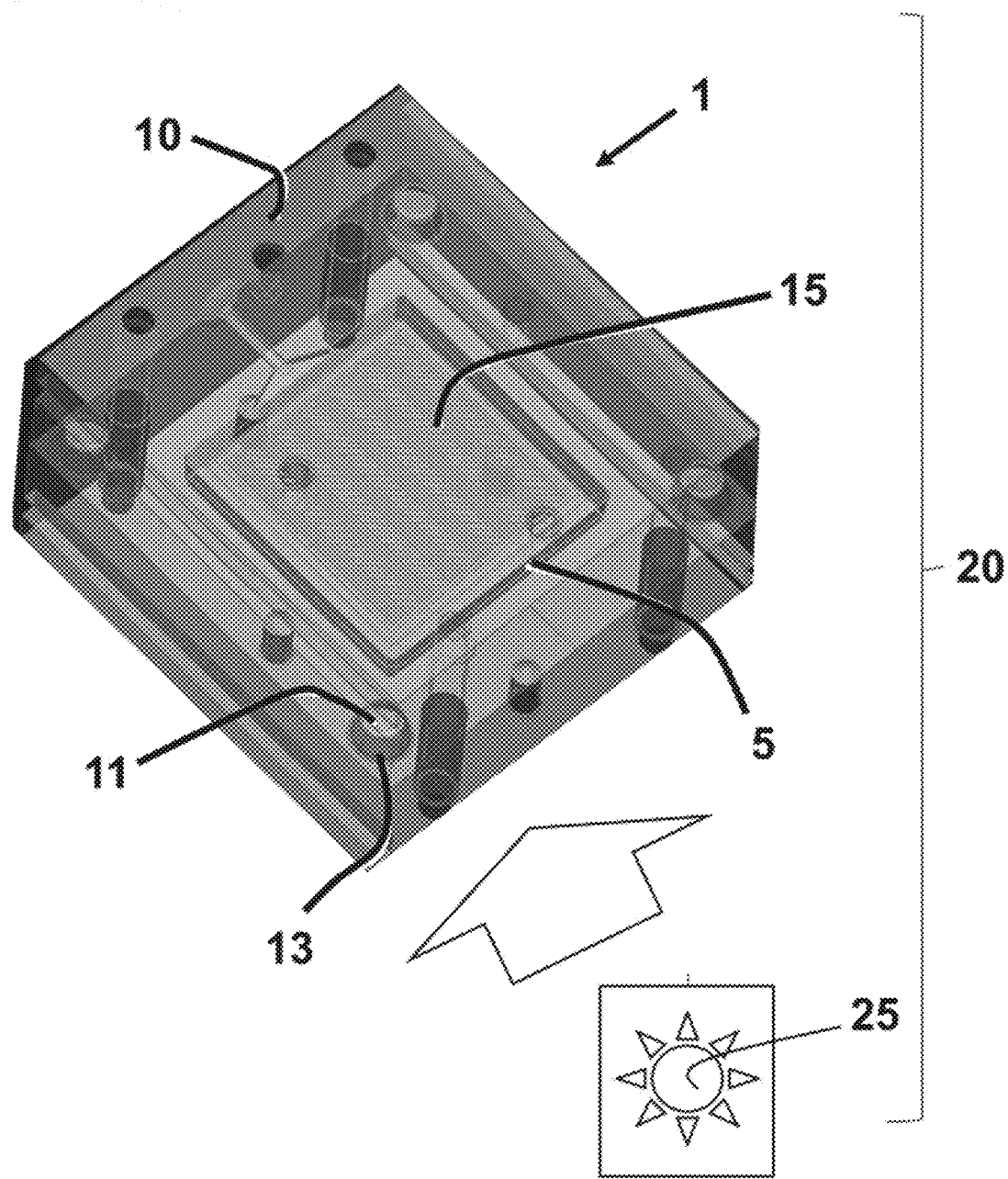
FIG. 1A is perspective top-down view of a mold apparatus formed according to the teachings of the present disclosure.
Figure 1B:
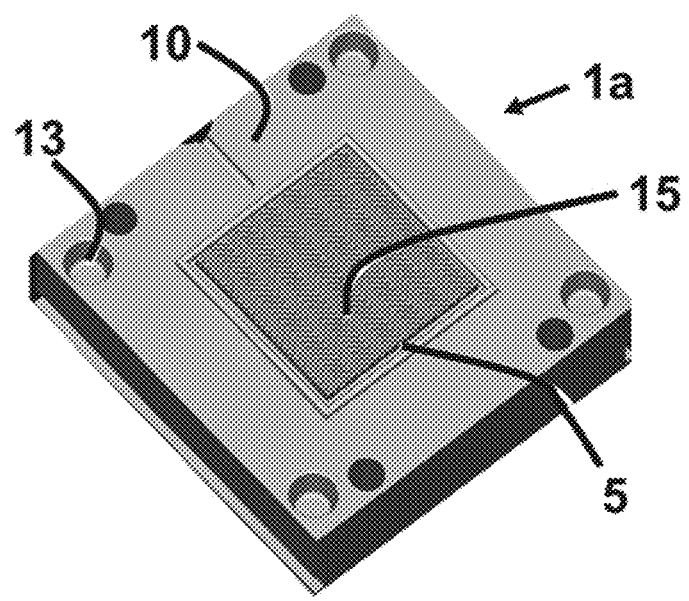
FIG. 1B is a perspective view of the bottom portion of the mold shown in FIG. 1A.
Figure 1C:
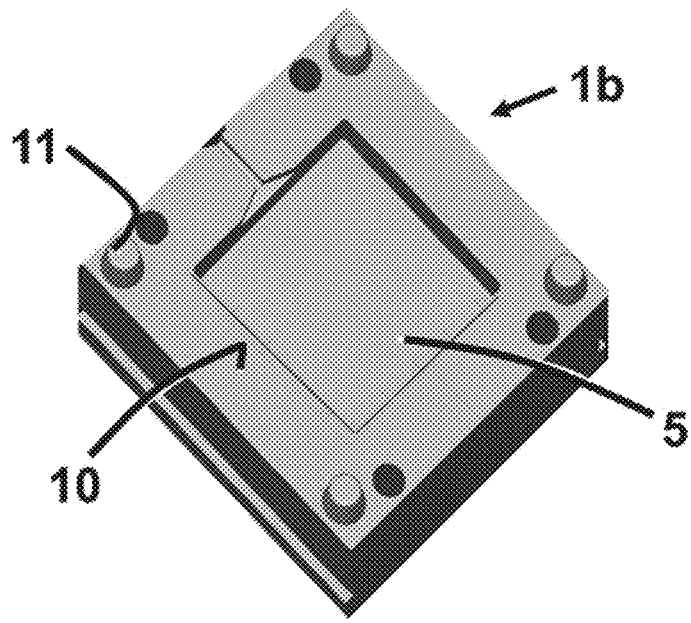
FIG. 1C is a perspective view of the interior of the top portion of the mold shown in FIG. 1A.

Referring to FIGS. 1A-1C, the mold 1 generally comprises a cavity 5 formed in a bulk material 10. At least a portion of the surface of cavity 5 within the mold 1 is formed of a mold wall 15 comprised of one or more cyclic olefin copolymers as further described herein. The surface of this mold wall 15 (i.e., a molding surface) is in contact, either directly or indirectly, with the UV radiation curable material or resin that is placed within the mold 1 to form an article or a molded component of the article. Alternatively, the molding surface or the surface of the mold wall 15 is in direct contact with the UV radiation curable material used to form the article or the molded component of the article. The molding surface may exhibit a surface energy that is in the range of about 15 dynes/cm to about 35 dynes/cm at 20° C. Alternatively, the surface energy of the molding surface is between about 20 dynes/cm to about 30 dynes/cm. The mold may be used to form a molded footwear component, a molded apparel component, or a molded sporting equipment component. Alternatively, the mold is used to form a molded footwear component.

For the purpose of this disclosure the terms "about" and "substantially" are used herein with respect to measurable values and ranges due to expected variations known to those skilled in the art (e.g., limitations and variability in measurements).

For the purpose of this disclosure any range in parameters that is stated herein as being "between [a $1^{st}$ number] and [a $2^{nd}$ number]" or "between [a $1^{st}$ number] to [a $2^{nd}$ number]" is intended to be inclusive of the recited numbers. In other words the ranges are meant to be interpreted similarly as to a range that is specified as being "from [a $1^{st}$ number] to [a $2^{nd}$ number]".

The cyclic olefin copolymers comprise one or more amorphous, transparent copolymers based on cyclic olefins and linear olefins. The cyclic olefin copolymers may include copolymers that have the general formula shown in Equation 1, where x and y represent integers that defines the ratio of linear to cyclic segments (e.g., ratio of x to y) in the cyclic olefin copolymer. Alternatively, the cyclic olefin copolymer may comprise a copolymer of polyethylene and norbornene.

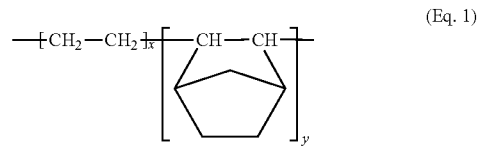

(Eq. 1)

The cyclic olefin copolymers provide the benefits of being at least partially transparent to UV radiation, low density, low birefringence, low water absorption, high heat deflection temperature, and good processability (e.g., flowability), as well as high strength, hardness, and rigidity. Alternatively, the cyclic olefin copolymer used to form the mold wall 15 is substantially transparent to UV light or radiation and allows the UV radiation to be transmitted through the mold wall 15 to the molding surface and to the UV radiation curable material used to form the article or the molded component of the article. Several specific examples of cyclic olefin copolymers include, without limitation, materials that are commercially available under the tradenames TOPAS®, including TOPAS® 6017 and TOPAS® 6015, (Topas Advanced Polymers, Florence, KY, USA) and APEL™ (Mitsui Chemicals Inc., Tokyo, Japan).

The cyclic olefin copolymers exhibit transparency on the order of about 80% to 100%, alternatively, about 90% for light that is in the near ultraviolet region (i.e., ~300 nm to ~400 nm wavelength) and visible region (i.e., ~400 nm to ~700 nm wavelength). The cyclic olefin copolymers may further exhibit transparency of light within a wavelength ranging from about 250 nm to less than 300 nm that is on the order of about 10% to about 85%. In some examples, the cyclic olefin copolymers exhibit greater than about 20% light transmittance.

In order to more easily process the UV radiation curable material, as well as provide a buffer between processing and deflection, a mold comprising a cyclic olefin copolymer that exhibits a high deflection temperature (HDT) may be desirable. Typically, a cyclic olefin copolymer with a higher cyclic olefin component (i.e., segment y) will exhibit a higher heat resistance. In this respect, the cyclic olefin copolymer may exhibit a heat deflection temperature (HDT) at 0.46 MPa of at least 140° C. as characterized by HDT testing in accordance with the ISO 75-1 Test Standard. Alternatively, the HDT of the cyclic olefin copolymers ranges from about 165° C. to about 200° C. Several specific examples of commercially available cyclic olefin copolymers that have an HDT in this range include, without limitation, Topas® 6015 and 6017 (Topas Advanced Polymers Inc.) with an HDT of 150° C. and 170° C., respectively.

The cyclic olefin copolymer may be pre-compounded as sheets or be in the form of a pelletized material, flakes, strips, or any other form as desired or necessary to meet application requirements. The cyclic olefin copolymer may be milled to provide a thinner thickness and/or to reduce the presence of air voids. When desirable, the cyclic olefin copolymer may be dried to remove any residual moisture prior to be formed into a mold. Although optional, pre-drying the cyclic olefin polymer may reduce the amount of moisture splay present in the mold wall formed therefrom, resulting in an increased level of optical transparency. Any known method of pre-drying the cyclic olefin copolymer may be utilized. These methods may include but not be limited to drying the cyclic olefin copolymer in a dehumidifying oven at 80° C. or higher for a predetermined amount of time, such as for example, a period greater than about 1 hour; alternatively, greater than about 2.5 hours; alternatively, greater than about 4 hours.

Referring once again to FIGS. 1A-1C, the bulk material 10 of the mold 1 may be comprised of a metal or metal alloy, a thermally stable polymer material, a ceramic material, or a mixture thereof. The mold 1 may be used, without limitation, in a compression molding operation or an injection molding process. Optionally, the mold 1 may comprise mechanical features and connections that allow one or more molding surfaces 15 located in the cavity 5 to be heated and/or cooled.

The bulk material 10 portions of the mold 1 may be manufactured from planar sheet materials that have a constant thickness. When desirable this sheet material may include a plurality of UV radiation deflecting particles within the bulk material 10 or positioned on the surface of the bulk material 10, such as incorporated within a coating applied thereto. For the purpose of this disclosure, a UV radiation deflecting particle means any particle capable of diverting the direction of the transmitted UV radiation by scattering and/or reflection thereof.

The bulk material 10 may be transformed into the desired shape of the article or component of the article by any known process, including but not limited to, machining, thermoforming and/or assembling, such that the interior contour of the cavity 5 represents the negative or positive form of the article or component of the article that is to be shaped within the mold 1.

The wall thickness of the bulk material, as well as thickness of the mold wall that comprises the UV transparent material (i.e., the cyclic olefin copolymer) can vary from about 0.5 millimeters (mm) to about 75 mm, allowing for the manufacture of flexible or rigid molds. Alternatively, the wall thickness of the bulk material and/or UV transparent mold wall is within the range of about 1.0 mm to about 50 mm; alternatively, within the range of about 1.5 mm to about 30 mm; alternatively, within the range of about 2.0 mm to about 15 mm; alternatively within the range of about 2.0 mm to about 10 mm.

According to another aspect of the present disclosure the inner volume of the cavity allows for the formation of a molded component having a thickness that is greater than about 0.05 millimeters (mm); alternatively, with the range of about 0.05 mm to about 1.0 cm; alternatively, within the range of about 1.0 mm to about 5.0 mm. The thickness of the molded article or molded component of the article may be variable over the length and/or width of the article or the molded component. The thickness of the bulk material 10 and the UV transparent mold wall 15 that are within the indicated range provide a mold 1 that is durable for use through multiple molding cycles.

In particular examples, the UV transparent mold wall, the molding surface, or both the UV transparent mold wall and the molding surface exhibits transparency on the order of about 80% to 100%, alternatively, about 90% for light that is in the near ultraviolet region (i.e., ~300 nm to ~400 nm wavelength) and visible region (i.e., ~400 nm to ~700 nm wavelength). The UV transparent mold wall, the molding surface, or both the UV transparent mold wall and the molding surface may further exhibit transparency of light having a wavelength ranging from about 250 nm to less than 300 nm that is on the order of about 10% to about 85%. In some examples, the mold wall, the molding surface, or both the UV transparent mold wall and the molding surface exhibits greater than about 20% light transmittance.

The mold 1 may comprise more than one part or die portion 1a (FIG. 1B), 1b (FIG. 10) that fit together to form the cavity 5 bordered by the molding surface(s) 15. The different parts 1a, 1b of the mold may be designed to be held together using a variety of different fasteners, including without limitation, the mating combination of pins 11 and sockets 13. In other words, the mold wall 15 may form at least part of a first die portion 1a, and the mold 1 further comprises a second die portion 1b, wherein the first and second die portions 1a, 1b are configured to move relative to each other between an opened position and a closed position, and wherein the first and second die portions 1a, 1b in the closed position defines a cavity 5 for molding the UV radiation curable material that forms the article or the molded component of the article. When the mold 1 is used in a compression molding process, the first and second die portions 1a, 1b may be configured for compression molding the UV radiation curable material to form the molded article or the molded component of the article.

Referring again to FIG. 1A, the mold 1 may form part of a molding apparatus 20, which also comprises an UV light source 25. The UV light source 25 and the mold 1 may be separable from each other or inherently combined to form the molding apparatus 20. In other words, the apparatus 20 may comprise a mold 1 made of only one or of a plurality of mold or die portions 1a, 1b that can be fitted together to form the mold 1 and separated from each other to release a manufactured product from the mold 1. Alternatively, the apparatus 20 may further comprise a conveyor system or similar mechanism to move the mold 1 or the UV light source 25 into a position in which the UV radiation arising from the light source 25 is aligned with the UV transparent portion of the mold wall 15. One specific example, among many examples, of an apparatus 20 that comprises a conveyor system capable of moving a separable mold past an UV light source is the LC6B/LC6B-2 UV curing unit available from Heraeus Noblelight America LLC (Gaithersburg, MD).

The UV light source 25 generates UV radiation of which at least a portion thereof is transmitted through the molding surface 15 to the article-forming or UV radiation curable material placed within the cavity 5 and in contact with molding surface 15. In other words, the apparatus 20 comprises a mold 1 having a mold wall 15 that comprises a cyclic olefin copolymer and that is substantially transparent to ultraviolet (UV) light, wherein the mold wall 15 has a molding surface for contacting an article-forming material; and an UV light source 25 disposed adjacent to the mold wall 15 on a side opposite the molding surface and configured to generate UV radiation for transmission through the mold wall 15 to the molding surface for exposing the article-forming material to the UV light.

The UV light source may include any type of UV light that transmits UV radiation in a wavelength to which the cyclic olefin copolymer used in the mold wall is at least partially transparent (e.g., can be at least partially transmitted there through). Several examples of UV light sources, include but are not limited to, xenon lamps, mercury lamps, black-light lamps, excimer lasers and UV-LED lamps. Alternatively, the UV light source is an UV-LED lamp; a low, medium, or high pressure mercury vapor lamp; a xenon lamp; a quartz halogen lamp; or a laser operating in the short wavelength portion of the spectra. Several more specific examples of UV light sources include, but are not limited to, short-wave UV lamps, gas-discharge lamps, ultraviolet LEDs, UV lasers, tunable vacuum ultraviolet (VUV) obtained from sum and difference frequency mixing, or plasma and synchrotron sources of extreme UV radiation. When desirable more than one light source may be used with each light source being individually selected. When desirable or determined necessary, the irradiation intensity of the UV light at the previously defined wavelength to which the UV radiation curable material is exposed may be within the range of about 0.5 W/cm$^2$ to about 5 W/cm$^2$; alternatively, about 1.0 W/cm$^2$ to about 4.0 W/cm$^2$; alternatively, within the range of 1.5 W/cm$^2$ to 4.0 W/cm$^2$.

Figure 2A:
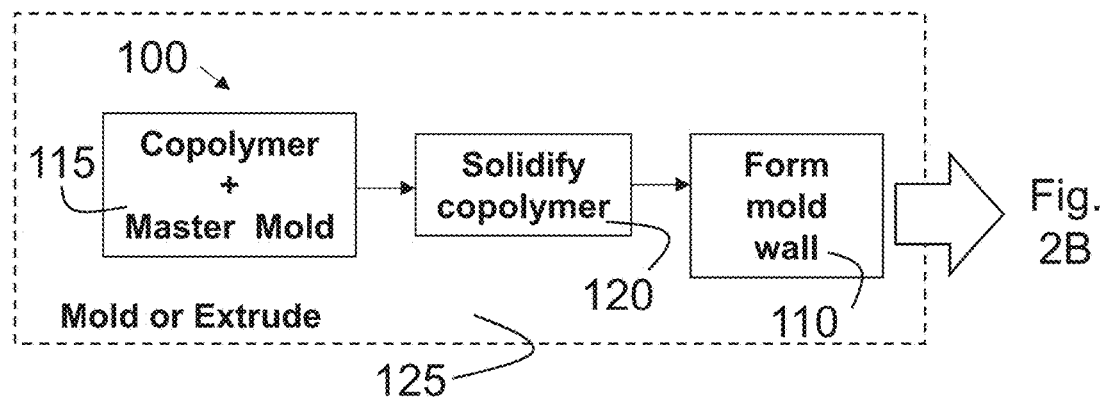
FIG. 2A is a flow chart of a method of forming a mold according to the teachings of the present disclosure.

Referring now to FIG. 2A, a method 100 of making a mold for use in forming a molded article or component of an article from a UV radiation curable material is provided. This method 100 comprises forming 110 a mold wall that comprises a cyclic olefin copolymer and has a molding surface for making contact with the article-forming material (i.e., the UV radiation curable material). The mold wall may be formed by introducing 115 molten cyclic olefin copolymer to a master mold and allowing the molten copolymer to solidify 120 in the master mold, thereby, forming the mold wall. The master mold includes a cavity encompassed by molding surfaces that is the negative or positive image of the shape desired for the mold that will be used to form a molded article or component from the article-forming (i.e., UV radiation curable) material.

The introduction 115 of the molten cyclic olefin copolymer into the master mold may be, without limitation, part of an injection molding process 125 or an extrusion process. The cyclic olefin copolymer is heated to a temperature that ranges from about 260° C. to about 320° C.; alternatively, ranging from about 260° C. to about 310° C.; alternatively, from about 270° C. to about 320° C., prior to being introduced 115 into the master mold. The molten cyclic olefin copolymer is solidified 120 in the master mold, which is maintained at a lower temperature. The temperature of the master mold may be about 160° C. or less; alternatively, in the range from about 120° C. to about 160° C.

Figure 2B:
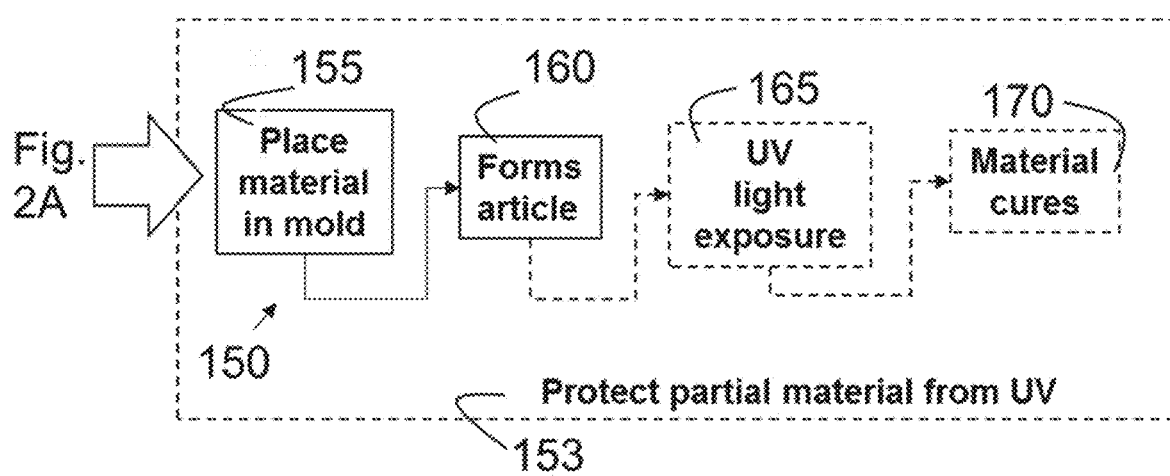
FIG. 2B is a flow chart of a method of forming an article or a component of an article using the mold of FIG. 2A.

Referring now to FIG. 2B, a method 150 of forming a molded article or component of an article is also provided in which the article-forming (i.e., UV radiation curable) material is introduced 155 in the mold described above that comprises a mold wall formed at least partially of the cyclic olefin copolymer. The article-forming material contacts 160 the molding surface of the surface of the mold wall in order to form the molded article or component. When desirable, the cyclic olefin copolymer may comprise a copolymer of polyethylene and norbornene.

When desirable, various precautions or safeguards may be undertaken by one skilled in the art in order to protect 153 at least a portion of the UV-curable material from being exposed to UV radiation during one or more steps of the method. Such precautions or safeguards may include, but not be limited to, masking a portion of the UV radiation curable material or the surface upon which the material is in contact, as well as maintaining the UV radiation curable material in an environment that is absent any UV light or visible light or both.

The mold wall is at least partially transparent; alternatively, substantially transparent to UV light or radiation. In this sense, the method may further comprise transmitting 165 the UV light through the mold wall to the molding surface for exposing the article-forming material to the UV light. The UV radiation curable material is cured 170 in response to being exposed to the UV radiation. The UV radiation curable material is exposed to the UV radiation in an amount and for a duration that is sufficient to partially cure or fully cure the UV radiation curable material.

For the purpose of this disclosure, the term "partially cured" is intended to denote the occurrence of at least about 1%, alternatively, at least about 5% of the total polymerization required to achieve a substantially full cure. The term "fully cured" is intended to mean a substantially full cure in which the degree of curing is such that the physical properties of the UV radiation curable material does not noticeably change upon further exposure to additional UV radiation.

The UV radiation curable material generally comprises one or more photopolymers or light-activated resins that will undergo a cross-linking reaction upon exposure to UV radiation. The UV radiation curable material may comprise a mixture of various multifunctional monomers, oligomers, and/or low molecular weight polymers or copolymers, along with one or more photoinitiator(s) that can undergo polymerization in the presence of UV radiation. Upon exposure to UV radiation, the photoinitiator decomposes into a reactive species that activates polymerization of specific functional groups that are present in the multifunctional oligomers, monomers, or polymers.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane is interpreted to include one or more polymer molecules of the polyurethane, where the polymer molecules may or may not be identical (e.g., different molecular weights).

The end result of curing a light-activated resin in this manner is the formation of a thermoset or cross-linked polymer network. Thus, the UV radiation curable material may be described as being an UV radiation curable elastomer. Alternatively, the UV radiation curable material may comprise an UV radiation curable rubber. The UV radiation curable material may comprise one or more thermoset polymers, thermoplastic polymers, or combinations thereof. When desirable, the one or more thermoplastic polymers may be one or more thermoplastic polyurethanes (TPU).

Several specific examples of various monomers that may be used in the UV radiation curable material include, but are not limited to, styrene and styrenic compounds, vinyl compounds, vinyl ethers, N-vinyl carbazoles, lactones, lactams, cyclic ethers, cyclic acetals, and cyclic siloxanes. Several specific examples of oligomers and low molecular weight polymers or copolymers that may be incorporated into the UV radiation curable material include, without limitation, vinyl butadiene, epoxides, urethanes, polyethers, or polyesters, each of which provide specific properties to the resulting material. Each of these oligomers or polymers may be functionalized using an acrylate. Alternatively, the UV radiation curable material may include a mixture of urethane and acrylate oligomers or a copolymer thereof.

Photoinitiation may occur via a free radical mechanism, an ionic mechanism, or a combination thereof. Under an ionic mechanism, the polymerizable oligomers, monomers, or polymers are doped with either anionic or cationic photoinitiators. Several examples of such photoinitiators, include without limitation, onium salts, organometallic compounds, and pyridinium salts. In the free radical mechanism, the photoinitiators generate free-radicals by the abstraction of a hydrogen atom from a donor or co-initiator compound (i.e., a 2-component system), or by the cleavage of a molecule (i.e., a 1-component system). Several specific examples of abstraction type photoinitiators, include but are not limited to, benzophenone, xanthones, and quinones with common donor compounds being aliphatic amines. Several specific examples of cleavage-type photoinitiators include, without limitation, benzoin ethers, acetophenones, benzoyl oximes, and acylphosphines. Photocurable materials that form through the free-radical mechanism undergo chain-growth polymerization, which includes three basic steps: initiation, chain propagation, and chain termination. Alternatively, the photoinitiators are independently selected and may include phosphine oxides, benzophenones, a-hydroxyalkyl aryl ketones, thioxanthones, anthraquinones, acetophenones, benzoins and benzoin ethers, ketals, imidazoles, phenylglyoxylic acids, peroxides, and sulfur-containing compounds.

The amount of photoinitiators present in the UV radiation curable material is determined by the effective amount necessary to induce crosslinking of the UV radiation curable material. This amount may range from about 0.05 weight percent (wt. %) to about 5 wt. %, alternatively, from about 0.1 wt. % to about 2 wt. %, and alternatively, from about 0.2 wt. % to about 1 wt. % based on the weight of the UV radiation curable material. A single type of photoinitiator or a mixture of different photoinitiators may be used.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

According to another aspect of the present disclosure, the UV radiation curable material may comprise, consist of, or consist essentially of a millable polyurethane gum that includes ethylenic unsaturation, one or more photoinitiators, and at least one additional crosslinking additive that comprises two or more ethylenically unsaturated groups. The millable polyurethanes may be prepared by the reaction of a di- or polyisocyanate with bis(hydroxyl)-functional compounds, at least one of which contains ethylenic unsaturation. Alternatively, unsaturated polyester polyols may be used, alone or in combination with other isocyanate-reactive components, such as polyoxyalkylene glycols and/or diols capable of providing pendent ethylenic unsaturation. A commercial example of such a UV radiation curable material is Millathane® UV (TSE Industries Inc., Clearwater, FL). A further description of such UV radiation curable materials is provided in U.S. Publication No. 2016/0362552, the entire content of which is hereby incorporated by reference.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The additional crosslinking additive present in the curable polyurethane composition may include any low molecular weight compounds that contain two or more ethylenically unsaturated groups. These unsaturated groups may include, without limitation, glycerol diallyl ether, 1,6-hexanediol di(meth)acrylate, triallylisocyanurate, trimethylolpropane di(meth)acrylate, trimethylolpropane tri(meth)acrylate, glycerol di(meth)acrylate, glycerol tri(meth)acrylate, propoxylated glycerol triacrylate, 1,2-divinyltetramethyldisiloxane, divinylbenzene, and the like. The molecular weight of this additional crosslinking additive may be less than about 2000 Da, alternatively less than about 1000 Da, alternatively less than about 500 Da. The concentration of the crosslinking additive in the UV radiation curable material is selected based upon the amount of ethylenic unsaturated groups that are desired. The concentration of this additive may range from about 0.01 wt. % to about 15 wt. %, alternatively, from about 1 wt. % to about 12 wt. %, and alternatively, from about 5 wt. % to about 10 wt. % based on the overall weight of the UV radiation curable material.

When desirable, the UV radiation curable material may optionally comprise one or more additional processing aids, including without limitation, plasticizers, mold release agents, lubricants, antioxidants, flame retardants, dyes, pigments, reinforcing and non-reinforcing fillers, fiber reinforcements, and light stabilizers or UV absorbers. When an UV absorber is incorporated into the UV radiation curable material in order to enhance the environmental stability thereof, it may be necessary or desirable to use a more powerful UV light source to achieve full cure of the material, or use an UV light source having an output wavelength that is in a range within the UV spectrum at which the UV absorber exhibits a reduced level of absorbance.

The reinforcing fillers that may optionally be incorporated into the UV radiation curable material may be organic, i.e. polymeric, or inorganic in nature. These fillers may exhibit a mean, weight average particle sizes that is ≤1 □m, alternatively, in the range between about 20 nanometers (nm) to about 500 nm. Several specific examples of reinforcing fillers include, but are not limited to, pyrogenic (i.e., fumed) metal oxides, such as alumina, titania, ceria, silica, and the like; colloidal metal oxides, such as colloidal alumina or silica; carbon black and acetylene black; metal hydroxides, such as aluminum hydroxide; glass or polymer microspheres; or limestone, talc, clay, and the like. The amount of filler present in the UV radiation curable material is selected based upon the requirements associated with a particular end use. Typically, the amount of reinforcing filler present in the UV radiation curable material ranges from 0 wt. % to about 20 wt. % based on the total weight of the UV radiation curable material. Fillers having the same chemical composition may be considered to be non-reinforcing fillers when their mean, weight average particle size is greater than 1 □m, alternatively, in the range of about 2 mm to about 500 mm.

The UV radiation curable material may be cured by irradiation with UV light transmitting a wavelength that is the same as the excitation wavelength exhibited by the photoinitiator present. The duration in time that the UV radiation curable material is irradiated with UV radiation is variable and based upon the nature and type of reactive oligomers, monomers, or polymers present in the UV radiation curable material, as well as type and concentration of the crosslinking additives, photoinitiators, and fillers, as well as the type and power associated with the available UV light source. The duration of UV exposure may range less than a second to several hours; alternatively, the exposure time is between about 1 second and about 1 hour; alternatively, between about 5 seconds and 5 minutes. The UV radiation curable material may be irradiated at ambient or room temperature within the confines of a molding operation or at a temperature associated with the component formed in a molding or extrusion process. When desirable the molded part may be subjected to a cooling step prior to irradiation with UV light. Although, no thermal cure is necessary, a dual cure system may be used when desirable.

Figure 3A:
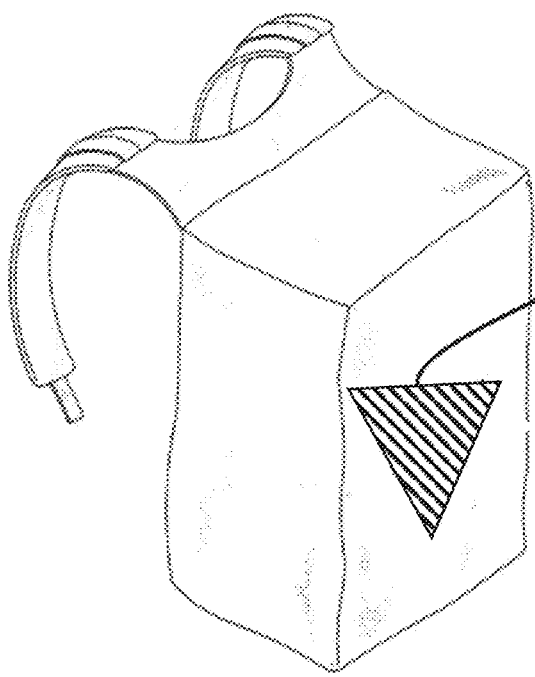
FIGS. 3(A-C) are perspective views of articles or components of articles formed according to the method of FIG. 2B.
Figure 3B:
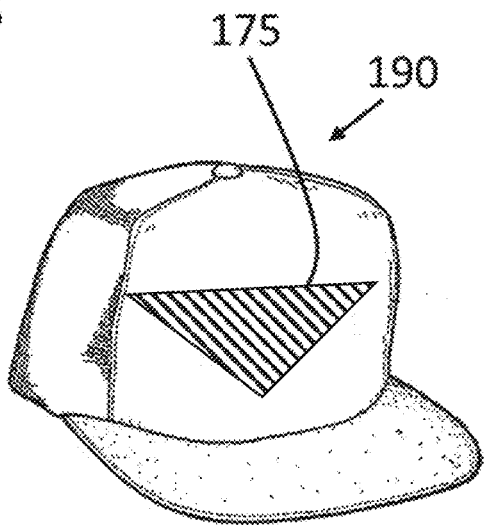
Figure 3C:
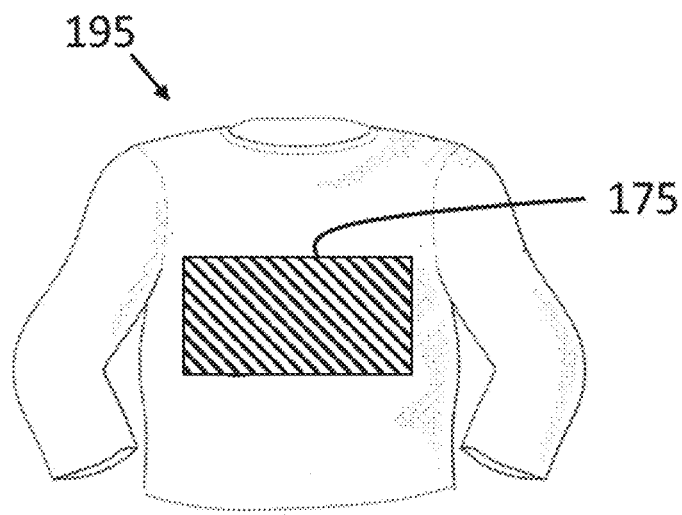
Figure 4A:
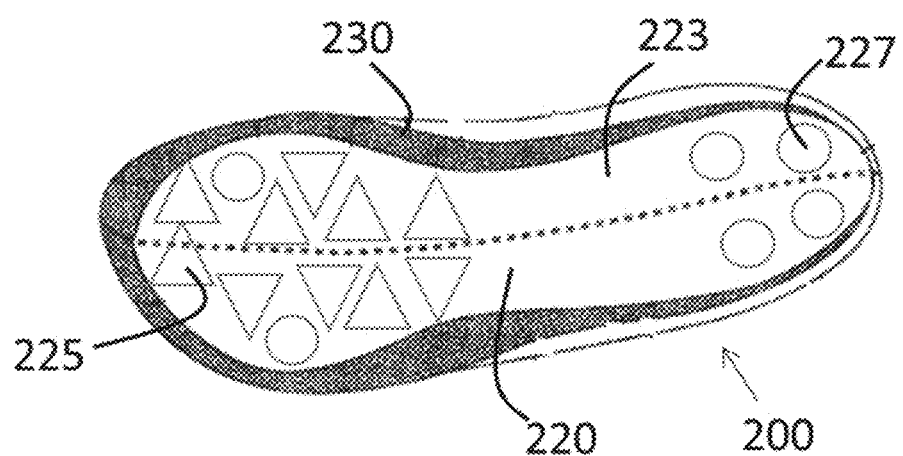
FIGS. 4(A-B) are perspective views of another article or a component of an article formed according to the method of FIG. 2B.
Figure 4B:
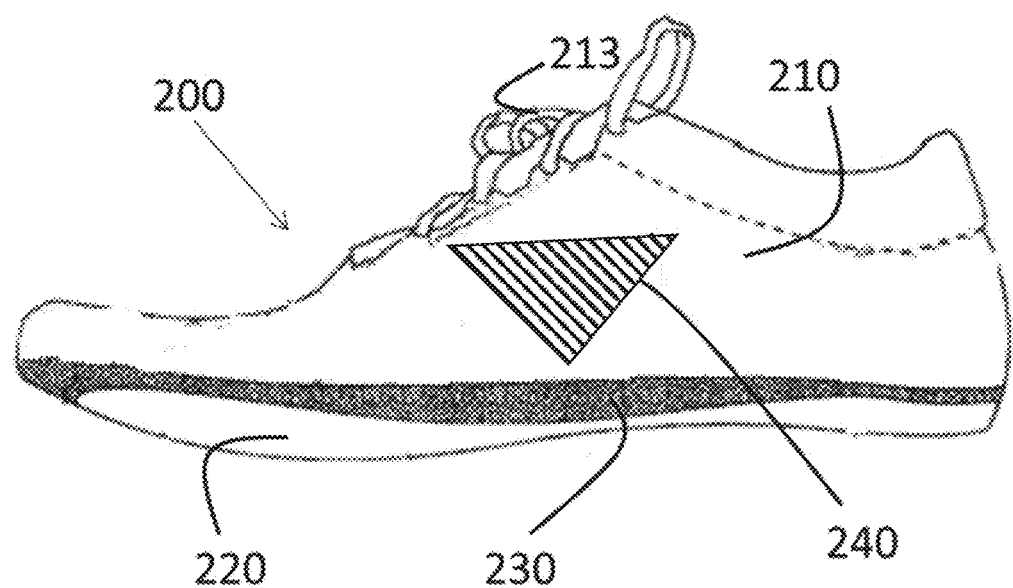

According to another aspect of the present disclosure, the article or component of the article formed from the UV radiation curable material according to the teachings of the present disclosure may be, without limitation, a garment, sporting equipment, or footwear. Alternatively, the article is component of a garment, sporting equipment, or footwear. For example, referring to FIGS. 3A and 3B, the component of sporting equipment may be a part or section 175 of a backpack 180 or a hat 190, including but not limited to a logo. Similarly, as shown in FIG. 3C, the component of a garment may be a part or section 175 of a shirt 195. In FIGS. 4A and 4B, the component of the article of footwear 200 may be an outsole 220, for example, or a logo or other component 240. As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability.

The article of footwear or shoe of the present disclosure may be designed for a variety of uses, such as sporting, athletic, military, work-related, recreational, or casual use. The article of footwear may be used outdoors on paved or unpaved surfaces (in part or in whole), such as on a ground surface including one or more of grass, turf, gravel, sand, dirt, clay, mud, and the like, intended for the performance of an athletic competition or as a general outdoor surface. The article of footwear may also be desirably used with indoor activities, such as indoor sports, shopping, and everyday work.

Referring now to FIGS. 4A and 4B, the footwear 200 or shoe 200 may comprise, consist of, or consist essentially of an upper 210 and an outsole 220 having a predetermined shape. The outsole 220 is in contact with and attached to the upper 210. At least part of the upper 210 and/or the outsole 220 comprises the UV radiation curable material as described above and further defined herein in an uncured or partially cured state.

Still referring to FIGS. 4A and 4B, the outsole 220 refers to the very bottom of the shoe that is in direct contact with the ground. The outsole 220 may be relatively smooth or include one or more traction elements 225. These traction elements 225 may provide enhanced traction, as well as provide support or flexibility to the outsole and/or provide an aesthetic design or look to the shoe. The traction elements 225 may include, but are not limited to a tread pattern, as well cleats, studs, spikes, or similar elements configured to enhance traction for a wearer during cutting, turning, stopping, accelerating, and backward movement.

Since the outsole 220 is the outer most sole of the shoe, it is directly exposed to abrasion and wear. Similarly, portions of the upper 210 are directly exposed to abrasion and wear. Various portions of the outsole 220 may be constructed with different thickness and exhibit different degrees of flexibility. The materials that comprise the outsole 220 should provide some degree of waterproofing, durability, and possess a coefficient of friction that is high enough to prevent slipping. In some cases two or more materials of different densities can be incorporated into the outsole 220 to give a hard wearing outer surface and a softer, more flexible midsole 230 for greater comfort. The upper 210 and/or the outsole 220 may be a single layer or may contain multiple layers of the same or similar material, provided at least a portion of the upper 210, at least a portion of the outsole 220, or portions of both the upper 210 and the outsole 220 comprise an UV radiation curable material. Alternatively, substantially all of the outsole comprises an UV radiation curable material.

The outsole 220 may be directly or otherwise operably secured to the upper 210 using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., adhered directly thereto or glued with a cement or an adhesive), can be integrally formed with the upper (e.g., as a unitary component), and combinations thereof.

Still referring to FIGS. 4A and 4B, the upper 210 of the footwear 200 has a body which may be fabricated from materials known in the art for making articles of footwear, and is configured to receive a user's foot. The upper 210 of a shoe consists of all components of the shoe above the outsole 220. The different components of the upper 210 may include a toe box, heal counter, and an Achilles notch, to name a few. These components are attached by stitches or adhesives to become a single unit to which the outsole is attached.

The upper 210 or components of the upper 210 may comprise a soft body made up of one or more lightweight materials. When desirable, the UV radiation curable material may be used to form a portion of the upper and/or a portion of a component of the upper. Such components of the upper may include, but not be limited to, a toe cap, a heel counter, a rand, or an eyelet stay, to name a few.

The materials used in the upper 210 provide stability, comfort, and a secure fit. For example, the upper may be made from or include one or more components made from one or more of natural or synthetic leather, a textile or both. The textile may include; a knit, braided, woven, or nonwoven textile made in whole or in part of a natural fiber; a knit, braided, woven or non-woven textile made in whole or in part of a synthetic polymer, a film of a synthetic polymer, etc.; and combinations thereof. The textile may include one or more natural or synthetic fibers or yarns. The synthetic yarns may comprise, consist of, or consist essentially of thermoplastic polyurethane (TPU), polyamide (e.g., Nylon®, etc.), polyester (e.g., polyethylene terephthalate or PET), polyolefin, or a mixture thereof.

The upper 210 and components of the upper 110 may be manufactured according to conventional techniques (e.g., molding, extrusion, thermoforming, stitching, knitting, etc.). While illustrated in FIGS. 4A and 4B as a generic design, the upper 310 may alternatively have any desired aesthetic design, functional design, brand designators, or the like.

Still referring to FIGS. 4A and 4B, the upper 210 may further comprise laces, flaps, straps, or other securing or foot engagement structures 213 used to securely hold the shoe 200 to a wearer's foot. A tongue member, bootie, or other similar type structure may be provided in or near the shoe instep area in order to increase comfort and/or to moderate the pressure or feel applied to the wearer's foot by any foot engagement structures 213.

When desirable, at least a portion of the upper 210 of the article of footwear, and in some embodiments substantially the entirety of the upper, may be formed of a knitted component. According to one aspect of the present disclosure, one or more pieces may be cut from a warp knit textile or a weft knit textile and assembled to form a portion of the upper 210. According to another aspect of the present disclosure, the upper may be formed by knitting to shape one or more large portions using, for example, flat knitting or circular knitting techniques. The upper may be formed by stitching together areas of the flat or circular knit, such as stitching together edges of a flat knit component, or stitching together the toe region of a circular knit component. The knitted component may additionally or alternatively form another element of the article of footwear 210 such as the insole, for example.

The knitted component may have a first side forming an inner surface of the upper 210 (e.g., facing the void of the article of footwear 200) and a second side forming an outer surface of the upper 210. An upper 210 including the knitted component may substantially surround the void so as to substantially encompass the foot of a person when the article of footwear is in use. The first side and the second side of the knitted component may exhibit different characteristics (e.g., the first side may provide abrasion resistance and comfort while the second side may be relatively rigid and provide water resistance). The knitted component may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted component without the need for significant post-knitting processes or steps. Alternatively, two or more portions of the knitted component may be formed separately and then attached. In some embodiments, the knitted component may be shaped after the knitting process to form and retain the desired shape of the upper (for example, by steaming the knitted component or fusing portions of the knitted component while the knitted component is on a foot-shaped last). The shaping process may include attaching the knitted component to another component (e.g., a strobel, etc.) and/or attaching one portion of the knitted component to another portion of the knitted component at a seam by sewing, by using an adhesive including a heat-activated adhesive, or by another suitable attachment process.

Forming the upper 210 with the knitted component may provide the upper 210 with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns or monofilaments formed of a particular material (e.g., a polyester material or an elastic material, such as spandex), by selecting yarns of a particular size (e.g., denier), or a combination thereof. The knitted component may also provide desirable aesthetic characteristics by incorporating yarns having different colors or other visual properties arranged in a particular pattern. The yarns and/or the knit structure of the knitted component may be varied at different locations such that the knitted component has two or more portions with different characteristics (e.g., a portion forming the throat area of the upper may be relatively elastic while another portion may be relatively inelastic). Yarns may also be coated with different materials, such as thermoplastic materials that have a lower melting point than the thermoplastic material that forms the core of the yarn.

In some embodiments, the knitted component may incorporate one or more materials with properties that change in response to a stimulus (e.g., temperature, moisture, electrical current, magnetic field, or light). For example, the knitted component may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component thereby forming an area of bonded or continuous material that exhibits certain advantageous properties including a relatively high degree of rigidity, strength, and water resistance, for example.

In some embodiments, the knitted component may include one or more yarns or strands that are at least partially inlaid or otherwise inserted within the knit structure of the knitted component during or after the knitting process, herein referred to as "tensile strands." The tensile strands may be substantially inelastic so as to have a substantially fixed length. The tensile strands may extend through a plurality of courses of the knitted component or through a passage within the knitted component and may limit the stretch of the knitted component in at least one direction. For example, the tensile strands may extend approximately from a bite-line of the upper to a throat area of the upper to limit the stretch of the upper in the lateral direction. The tensile strands may form one or more lace apertures for receiving a lace and/or may extend around at least a portion of a lace aperture formed in the knit structure of the knitted component.

When desirable, the article of footwear 200 or shoe 200 may also include a platform upon which the foot will rest that separates the upper 210 from the foot of the person wearing the shoe. This platform is typically a separate removable layer called an insole or sock liner (not shown) that is made of cellulose or other materials, such as thermoplastic or thermoset elastomers, including foam materials, capable of providing a cushion between the ground and the foot of the person wearing the shoe 200. The insole may be treated with additives to inhibit bacterial growth. When desirable, the insole may be incorporated with, e.g., sewn into, the upper.

Referring once again to FIGS. 4A and 4B, the outsole 220 of the shoe 200 may be engaged with or attached to the upper 210 and be directly adhered thereto. However, when desirable, a portion of the outsole may be attached to the upper 210 through the use of additional means conventionally known or used in the construction of footwear 200, such as through the use of cements or adhesives, by mechanical connectors, and by sewing or stitching, to name a few.

When desirable, the UV radiation curable material may be used to attach two or more elements together. More specifically, the UV radiation curable material may be applied to a textile or another portion of an upper and used to secure another or second layer of a material thereto. This second or additional layer may also be a textile, or it can be an injection molded component or even a decorative element. The second layer may be made of a material whose composition is similar to or different than the textile to which it is being attached.

The UV radiation curable material may also be used to overcoat a second layer that has been secured to the upper. When placed on top of the second layer, the UV radiation curable material may provide abrasion-resistance and/or act as a protective layer.

Figure 5:
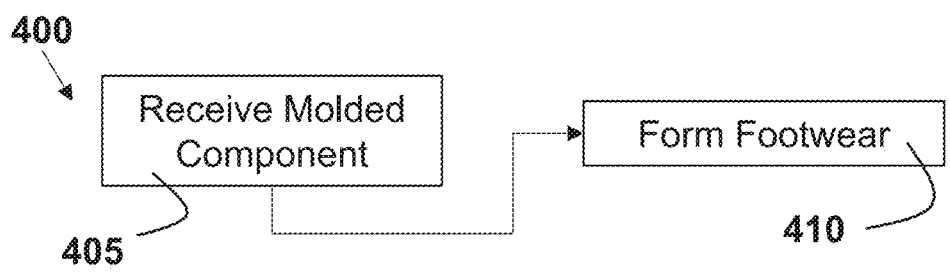
FIG. 5 is a flow chart of a method of forming an article of footwear according to the teachings of the present disclosure.

According to another aspect of the present disclosure, a method 400 of forming an article of footwear is provided as shown in FIG. 5. This method comprises the steps of providing 405 a molded article in the form of a molded footwear component and affixing 410 the molded component with an upper and optionally with other footwear components to form the article of footwear. As used for the purpose of this disclosure, the term "providing" may be defined as receiving, supplying, or making available something wanted or needed The following specific examples are given to illustrate the formation of an article or a component of an article according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1

This Example demonstrates the formation of an article using a mold having a molding surface that is transparent to UV radiation according to the teachings of the present disclosure. Referring now to FIG. 6, a mold 1 was designed to fit within a 7.5" width benchtop conveyor line of an UV curing apparatus 25. The UV curing apparatus 25 was a LC6B/LC6B-2 curing unit (Heraeus Noblelight America LLC, Gaithersburg, MD). The UV lamp 20 used in this apparatus 25 to cure the article-forming (i.e., UV radiation curable) material was a metal halide bulb. The mold 1 was selected to have the most basic geometry, i.e., a 4"×4" herringbone mold 1 with a cavity 5 capable of being completely filled with the article-forming material. The mold 1 was comprised of a bulk material 10 and a mold wall 15 that was formed of a cyclic olefin copolymer. The mold 1 was designed for use in a compression molding process.

A cured article 30 was formed using a paired mold 1. The mold 1 was a one-sided female mold having a mold wall 15 with a herringbone structure. The other or opposite side was pressed against a release paper. One skilled in the art will understand that other surfaces, such as a metal shim (aluminum and stainless), acrylic (PMMA) plaque, or some other flat plaque may be used as part of the mold 1 instead of release paper without exceeding the scope of the present disclosure. The cyclic olefin copolymer used to form the mold wall was TOPAS® Grade 6017 (Topas Advanced Polymers Inc., Florence, KY, USA). The mold wall 15 was formed by placing the cyclic olefin copolymer into a master molded and heated until cured. The cyclic olefin copolymer was processed according to the manufacturer's technical specification.

The article-forming (i.e., UV radiation curable) material was supplied as a pre-compounded sheet. The article-forming material was an UV radiation curable polyurethane rubber (Millathane® DUV 8263, TSE Industries Inc., Clearwater, FL). The UV radiation curable material was processed according to the manufacturer's technical specification. The material was milled to a thinner thickness, which reduced air voids. The article-forming material was placed in to the mold and compressed using a traditional compression press (two-platen system) with the application of pressure above 60 psi. The temperature of the mold was adjusted depending upon the application. In this example, the temperature of the mold was maintained at a temperature up to about 160° C.

Referring again to FIG. 6, after the article-forming material was compressed in the mold 1, the combination of the mold and article-forming material was placed through a UV curing station as described above. The resulting molded article 30 was then removed from the mold 1.

Example 2

This example demonstrates the formation of a component of an article using a mold having a molding surface that is transparent to UV radiation according to the teachings of the present disclosure. Referring now to FIG. 7A, a UV radiation curable material 33 is placed in contact with a fabric 35. In this example, the UV radiation curable material 33 is an UV radiation curable polyurethane rubber (Millathane® UV, TSE Industries Inc., Clearwater, FL) processed according to the manufacturer's technical specification. The material may be applied as two layers 31, 33 if desirable in order to provide a variable thickness, or the second layer 31 may be of a different material. The UV radiation curable material was pre-dried to remove surface moisture prior to use.

Referring now to FIG. 7B, the UV radiation curable material 33 and textile 35 are placed into the mold 1. The mold 1 in this example is the same mold 1 described above in Example 1. This mold comprises an outer bulk material 5 and a mold wall 15 having a herringbone design. In this mold at least the mold wall 15 comprises a cyclic olefin copolymer that exhibits transparency to UV radiation.

In FIG. 7C, the mold 1 with the UV radiation curable material 33 and fabric 35 are compressed using a traditional T-shirt press with the application of pressure in the range of about 20 psi to about 60 psi. In this example, the temperature of the mold was kept below 135° C. in order to minimize the potential for dye migration from the fabric 35.

Referring now to FIG. 7D, the compressed mold 1 was placed on a conveyer that moved the mold 1 into alignment with a UV light source 20 as part of the UV curing apparatus 25. The resulting molded article 30 was then removed from the mold 1. Finally, as shown in FIG. 7E, the finished article with the molded component formed therein 30 was removed from the mold. As shown in FIG. 7E, the finished component of the article adheres to the fabric and incorporates the herringbone pattern of the mold.

Within this specification, embodiments have been described in a way that enables a clear and concise specification to be written, but it is intended and will be appreciated that embodiments may be variously combined or separated without parting from the invention. For example, it will be appreciated that all preferred features described herein are applicable to all aspects of the invention described herein.

The subject matter of the disclosure may also relate, among others, to the following aspects:

1. A mold for forming a molded article, the mold comprising:
    a mold wall comprising a cyclic olefin copolymer and having a molding surface for contact with an article-forming material to form the molded article.
2. The mold of Aspect 1, wherein the cyclic olefin copolymer comprises a copolymer of polyethylene and norbornene.
3. The mold of Aspect 1 or 2, wherein the mold wall is substantially transparent to ultraviolet (UV) light to allow the UV light to be transmitted through the mold wall to the molding surface.
4. The mold of any of Aspects 1 to 3, wherein the cyclic olefin copolymer has a heat deflection temperature (HDT) at 0.46 MPa of at least about 140° C. as characterized by HDT testing in accordance with ISO 75-1 Test Standard.
5. The mold of Aspect 4, wherein the HDT of the cyclic olefin copolymer is from about 165 to about 200° C.
6. The mold of any of Aspects 1 to 5, wherein the mold surface has a surface energy of from about 15 to about 35 dynes/cm at 20° C. as characterized by surface measurement testing in accordance with ISO 8296 Test Standard.
7. The mold of any of Aspects 1 to 6, wherein the mold wall forms at least part of a first die portion, and the mold further comprises a second die portion, wherein the first and second die portions are configured to move relative to each other between an opened position and a closed position, and wherein the first and second die portions in the closed position defines a cavity for molding the article-forming material.
8. The mold of Aspect 7, wherein the mold is a compression mold and the first and second die portions are configured for compression molding the article-forming material to form the molded article.
9. The mold of any of Aspects 1 to 8, wherein the mold is a mold for forming a molded footwear component, a molded apparel component, or a molded sporting equipment component.
10. The mold of Aspect 9, wherein the mold is a mold for forming a molded footwear component.
11. A method for making a mold for forming a molded article, the method comprising:
    forming a mold wall comprising a cyclic olefin copolymer and having a molding surface for contact with an article-forming material for forming the molded article.
12. The method of Aspect 11, wherein forming the mold wall comprises:
    introducing molten cyclic olefin copolymer to a master mold; and
    solidifying the molten cyclic olefin copolymer in the master mold to form the mold wall.
13. The method of Aspect 11 or 12, wherein forming the mold wall includes using an injection molding process to introduce and solidify the molten cyclic olefin copolymer in the master mold.
14. The method of any of Aspects 11 to 13, wherein introducing comprises introducing the molten cyclic olefin copolymer having a temperature of from about 260° C. to about 320° C. to the master mold.
15. The method of any of Aspects 11 to 14, wherein solidifying comprises solidifying the molten cyclic olefin copolymer in the master mold that has a mold temperature of from about 120 to about 160° C.
16. The method of any of Aspects 11 to 15, wherein the mold is a mold for a molded footwear component, a molded apparel component, or a molded sporting equipment component.
17. The method of Aspect 16, wherein the mold is a mold for a molded footwear component.
18. A method for forming a molded article, the method comprising:
    introducing an article-forming material to a mold that comprises a mold wall comprising a cyclic olefin copolymer; and
    contacting the article-forming material with a molding surface of the mold wall for forming the molded article.
19. The method of Aspect 18, wherein the cyclic olefin copolymer comprises a copolymer of polyethylene and norbornene.
20. The method of Aspect 18 or 19, wherein the mold wall is substantially transparent to ultraviolet (UV) light, and wherein the method further comprises transmitting the UV light through the mold wall to the molding surface for exposing the article-forming material to the UV light.
21. The method of Aspect 20, wherein the article-forming material is an UV radiation curable material, and wherein the method further comprises curing the article-forming material in response to exposure to the UV light.
22. The method of Aspect 21, wherein the UV radiation curable material is an UV radiation curable elastomeric or rubber material, and wherein curing comprises curing the UV radiation curable elastomeric or rubber material in response to exposure to the UV light.
23. The method of Aspect 22, wherein the UV radiation curable elastomeric or rubber material is an UV radiation curable polyurethane rubber, and wherein curing comprises curing the UV radiation curable polyurethane rubber in response to exposure to the UV light.
24. The method of any of Aspects 18 to 23, wherein the mold wall forms at least part of a first die portion, and the mold further comprises a second die portion, and wherein contacting includes moving the first and second die portions relative to each other to a closed position for molding the article-forming material.

25. The method of Aspect 24, wherein the mold is a compression mold, and wherein contacting includes moving the first and second die portions relative to each other to the closed position for compression molding the article-forming material.
26. The method of any of Aspects 18 to 25, wherein the molded article is a molded footwear component, a molded apparel component, or a molded sporting equipment component.
27. The method of Aspect 26, wherein the molded article is a molded footwear component.
28. A molded article made by any of Aspects 18 to 27.
29. A method of manufacturing an article of footwear, the method comprising:
 providing a molded article made by any of Aspects 18 to 27, wherein the molded article is a molded footwear component; and
 affixing the molded footwear component and a footwear upper and/or other footwear component to make an article of footwear.
30. An apparatus for forming a molded article, the apparatus comprising:
 a mold comprising a mold wall that comprises a cyclic olefin copolymer and that is substantially transparent to ultraviolet (UV) light, wherein the mold wall has a molding surface for contacting an article-forming material; and
 an UV light source disposed adjacent to the mold wall on a side opposite the molding surface and configured to generate UV light for transmission through the mold wall to the molding surface for exposing the article-forming material to the UV light.
31. The apparatus of Aspect 30, wherein the apparatus is an apparatus for forming a molded footwear component, a molded apparel component, or a molded sporting equipment component.
32. The apparatus of Aspect 31, wherein the apparatus is an apparatus for forming a molded footwear component.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. A method for forming a molded footwear, apparel, or sporting goods component, the method comprising:
 contacting an article-forming material with a molding surface of a mold wall of a mold, wherein the molding surface comprises a cyclic olefin copolymer, and the article-forming material is an ultraviolet (UV) radiation curable polyurethane;
 placing a first textile into the mold in contact with the article-forming material;
 while the article-forming material remains in contact with the molding surface and the first textile, exposing the article-forming material to pressure and UV light passing through the molding surface; and
 curing the UV radiation curable polyurethane of the article-forming material in response to the exposure to the UV light, thereby forming the molded component and affixing the first textile to the molded component.
2. The method of claim 1, wherein the cyclic olefin copolymer comprises a copolymer of polyethylene and norbornene.
3. The method of claim 2, wherein the cyclic olefin copolymer has a heat deflection temperature (HDT) at 0.46 MPa of at least about 140° C. as characterized by HDT testing in accordance with ISO 75-1 Test Standard.
4. The method of claim 1, wherein the mold wall is substantially transparent to UV light, and wherein the method further comprises transmitting the UV light through the mold wall to the molding surface for exposing the article-forming material to the UV light.
5. The method of claim 1, wherein the cyclic olefin copolymer has a heat deflection temperature (HDT) at 0.46 MPa of at least about 140° C. as characterized by HDT testing in accordance with ISO 75-1 Test Standard.
6. The method of claim 5, wherein the HDT of the cyclic olefin copolymer is from about 165 to about 200° C.
7. The method of claim 1, wherein the mold surface has a surface energy of from about 15 to about 35 dynes/cm at 20° C. as characterized by surface measurement testing in accordance with ISO 8296 Test Standard.
8. The method of claim 1, wherein the mold wall forms at least part of a first die portion of the mold, and the mold further comprises a second die portion, wherein the first and second die portions are configured to move relative to each other between an opened position and a closed position, and wherein the first and second die portions in the closed position define a cavity for molding the article-forming material.
9. The method of claim 1, wherein the mold wall forms at least part of a first die portion of the mold, and the mold further comprises a second die portion, and wherein contacting the article-forming material includes moving the first and second die portions relative to each other to a closed position for molding the article-forming material.
10. The method of claim 1, wherein the molded component is a molded apparel component or a molded sporting equipment component.
11. The method of claim 1, wherein the curing attaches the first textile to one or more other elements using the UV radiation material.
12. The method of claim 11, wherein a first element of the one or more elements is a second textile.
13. The method of claim 3, wherein the HDT of the cyclic olefin copolymer is from about 165 to about 200° C.
14. The method of claim 13, wherein the molding surface has a surface energy of from about 15 to about 35 dynes/cm at 20° C. as characterized by surface measurement testing in accordance with ISO 8296 Test Standard.
15. A method of manufacturing an article, the method comprising:
 forming a molded component in accordance with the method of claim 1; and affixing the molded component and another part of the article to make the article.
16. The method of claim 15, wherein the curing attaches two or more elements together using the UV curable material.
17. The method of claim 16, wherein a first element of the two or more elements is the first textile.

18. The method of claim 17, wherein a second of the two or more elements is a second textile, and wherein the curing attaches the second textile to the first textile.

19. The method of claim 16, wherein the article is an apparel component or a sporting equipment component.

* * * * *